United States Patent
Shin et al.

(10) Patent No.: US 7,876,408 B2
(45) Date of Patent: Jan. 25, 2011

(54) TRANSFLECTIVE TYPE DIODE SUBSTRATE AND METHOD HAVING RESPECTIVE MASKS FORMING SCAN LINE AND INSULATING PATTERN, ORGANIC PATTERN WITH HOLE EXPOSING INSULATING PATTERN, AND PIXEL ELECTRODE COVERING HOLE AND REFLECTION ELECTRODE OVERLAPPING ORGANIC PATTERN

(75) Inventors: Hyung Beom Shin, Seoul (KR); Hong Sik Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/836,251

(22) Filed: Jul. 14, 2010

(65) Prior Publication Data

US 2010/0279445 A1 Nov. 4, 2010

Related U.S. Application Data

(62) Division of application No. 11/798,771, filed on May 16, 2007, now Pat. No. 7,777,843.

(30) Foreign Application Priority Data

May 17, 2006 (KR) .................. 10-2006-0044285

(51) Int. Cl.
*G02F 1/1335* (2006.01)
(52) U.S. Cl. ........................... 349/114; 349/187
(58) Field of Classification Search ............. 349/49–53, 349/114, 187
See application file for complete search history.

(56) References Cited

U.S. PATENT DOCUMENTS

| 6,734,460 | B2 | 5/2004 | Okumura et al. |
| 6,753,934 | B2 | 6/2004 | Park et al. |
| 6,801,274 | B2 * | 10/2004 | Suzuki ................... 349/106 |
| 6,809,785 | B2 | 10/2004 | Fujino |
| 2003/0218698 | A1 | 11/2003 | Otake et al. |
| 2005/0146657 | A1 | 7/2005 | Wen et al. |

* cited by examiner

*Primary Examiner*—John Heyman
(74) *Attorney, Agent, or Firm*—McKenna Long & Aldridge

(57) ABSTRACT

A transflective diode substrate for a liquid crystal display device, includes: a reflective zone including a diode having a scan electrode, an insulating pattern on the scan electrode and a pixel electrode over the scan electrode, organic patterns around the diode, and a reflection electrode over the organic patterns; and a transmissive zone adjacent to the reflective zone; wherein the pixel electrode is formed in the reflective zone and the transmissive zone.

7 Claims, 19 Drawing Sheets

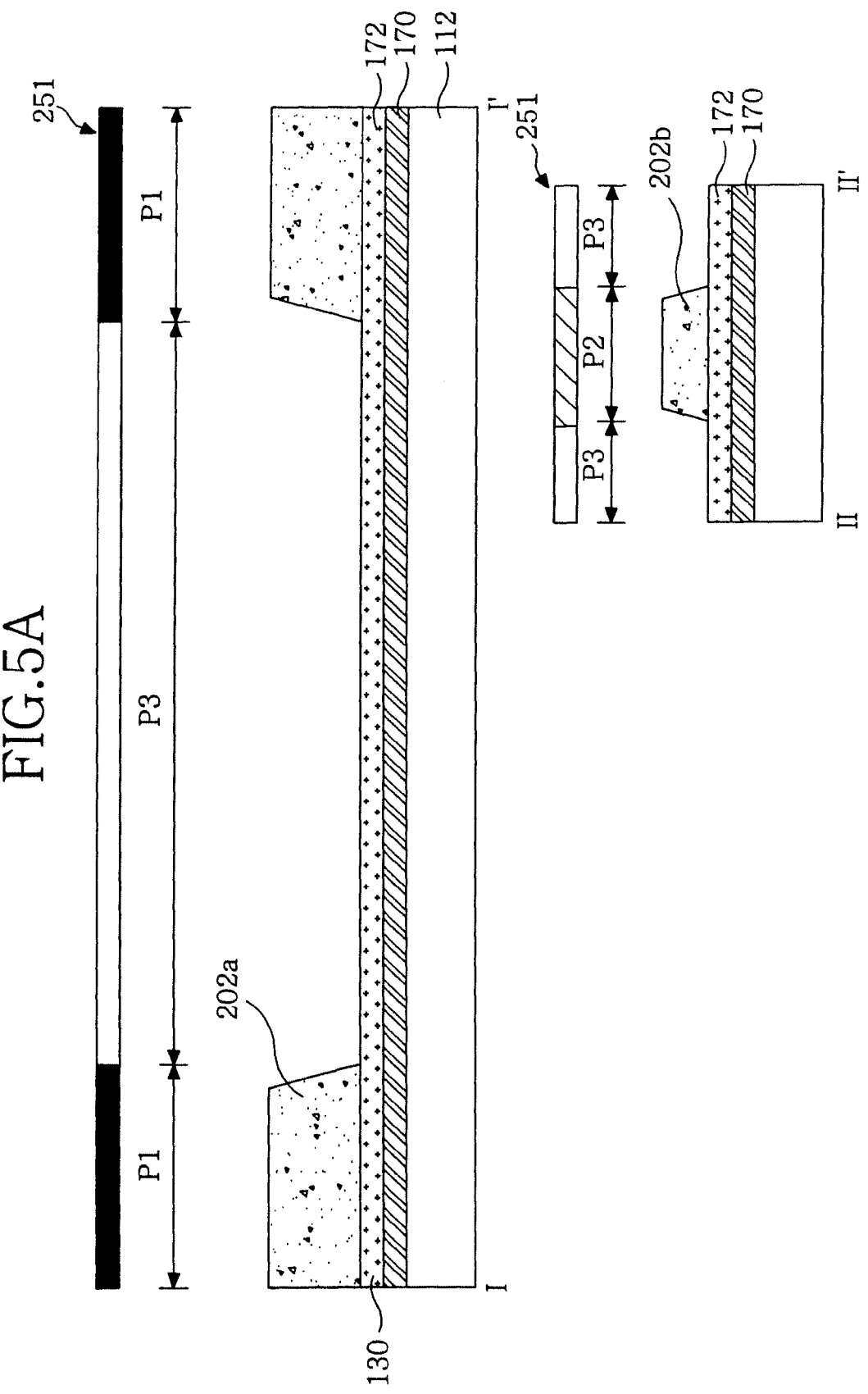

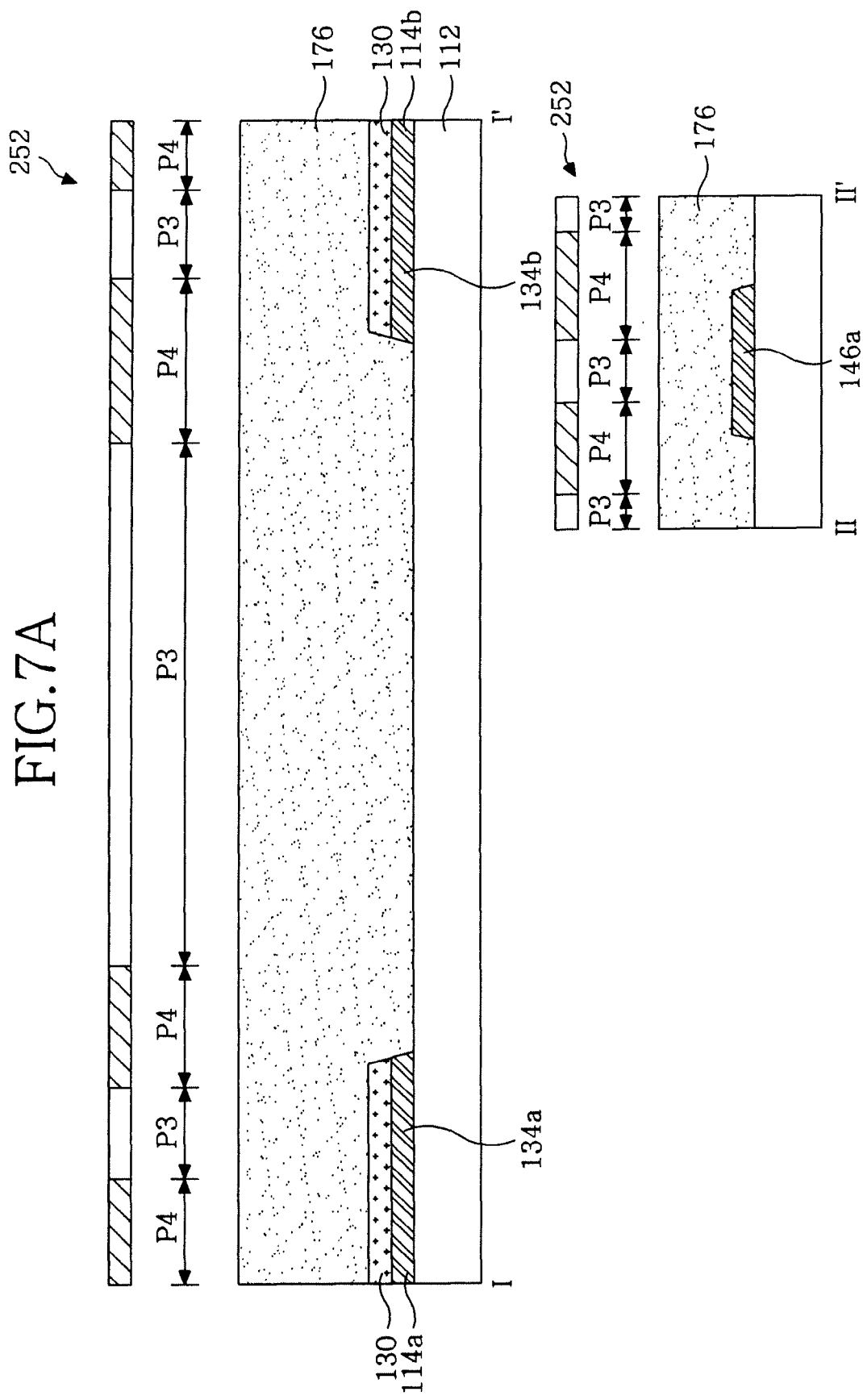

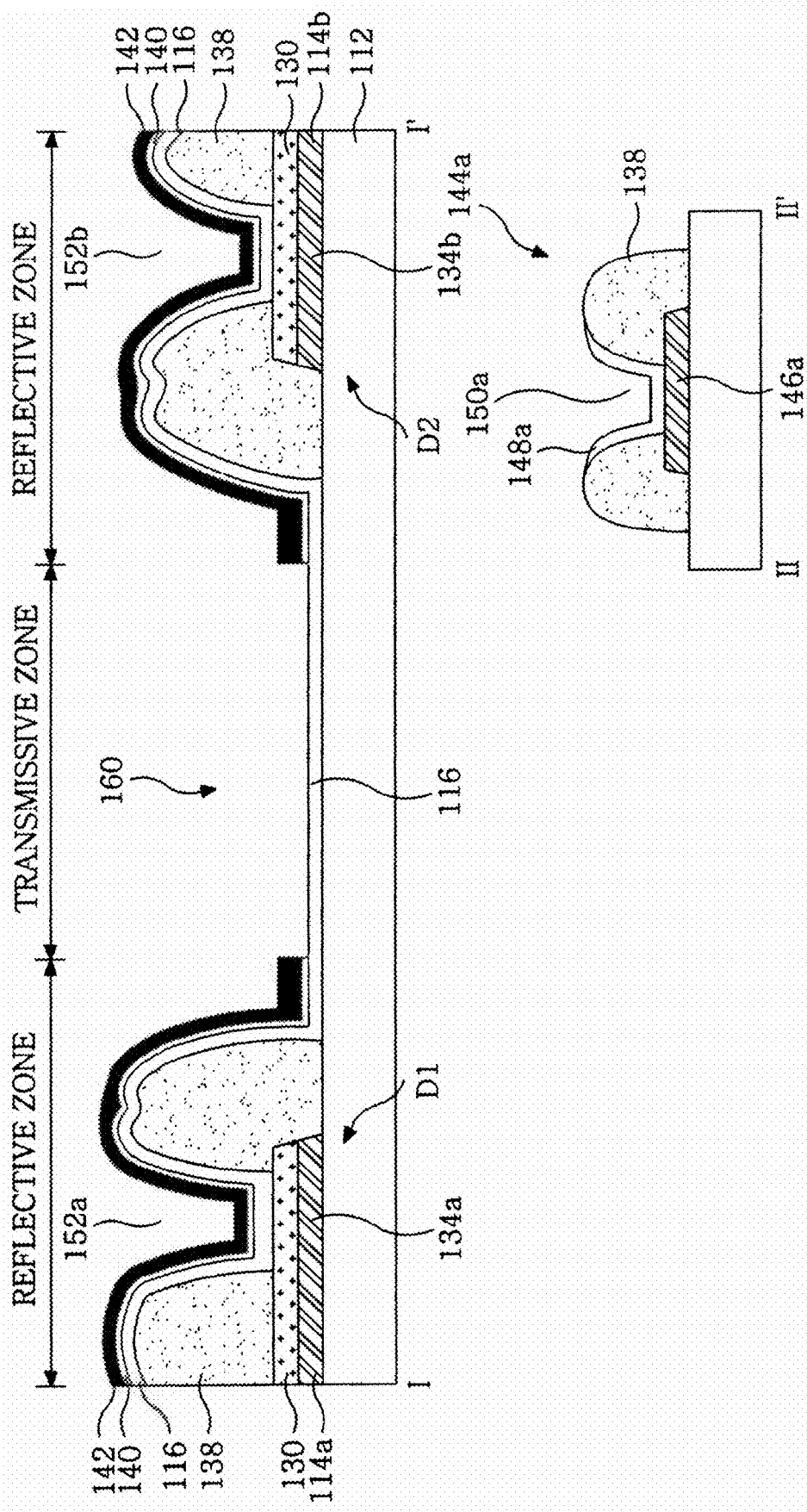

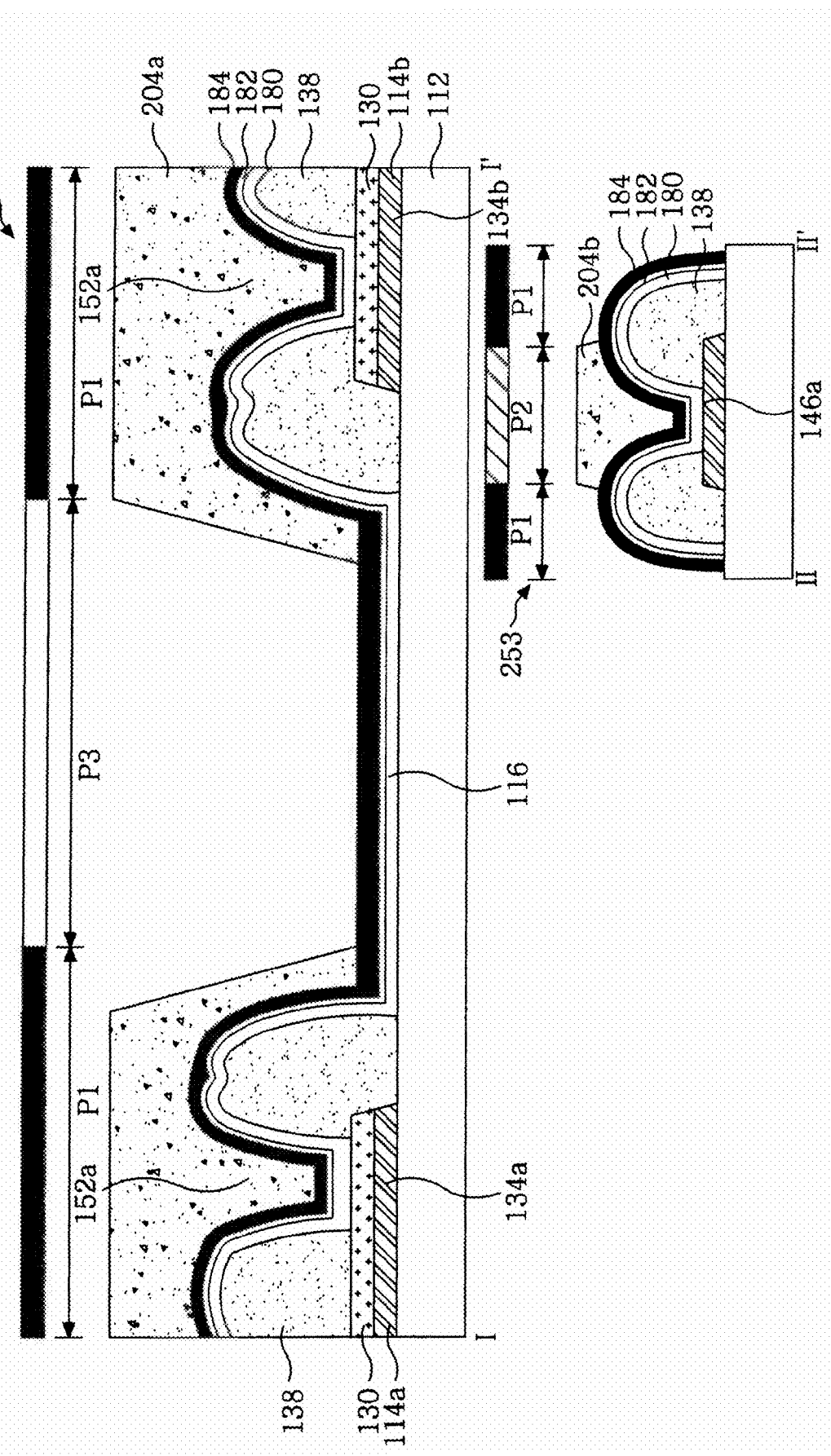

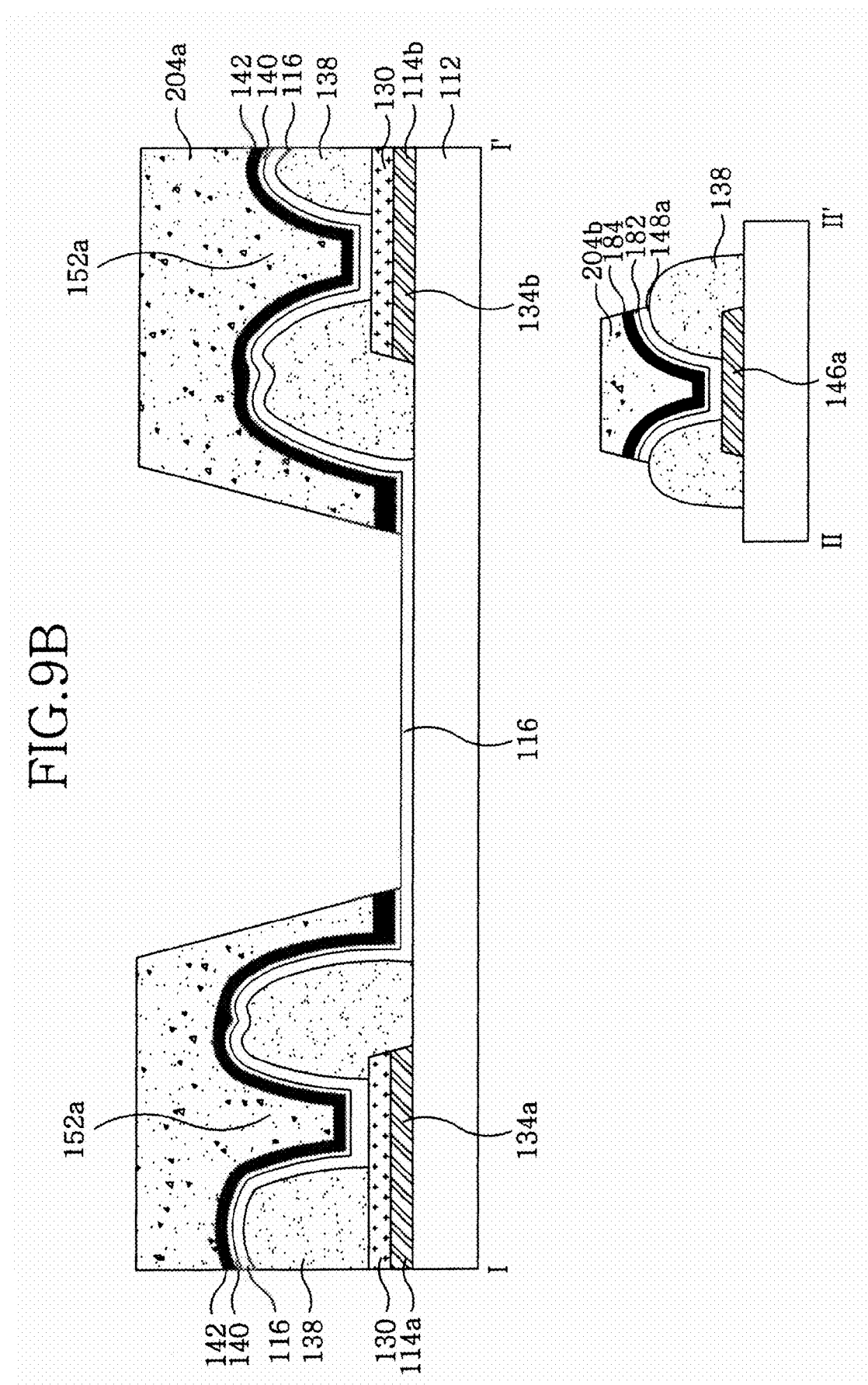

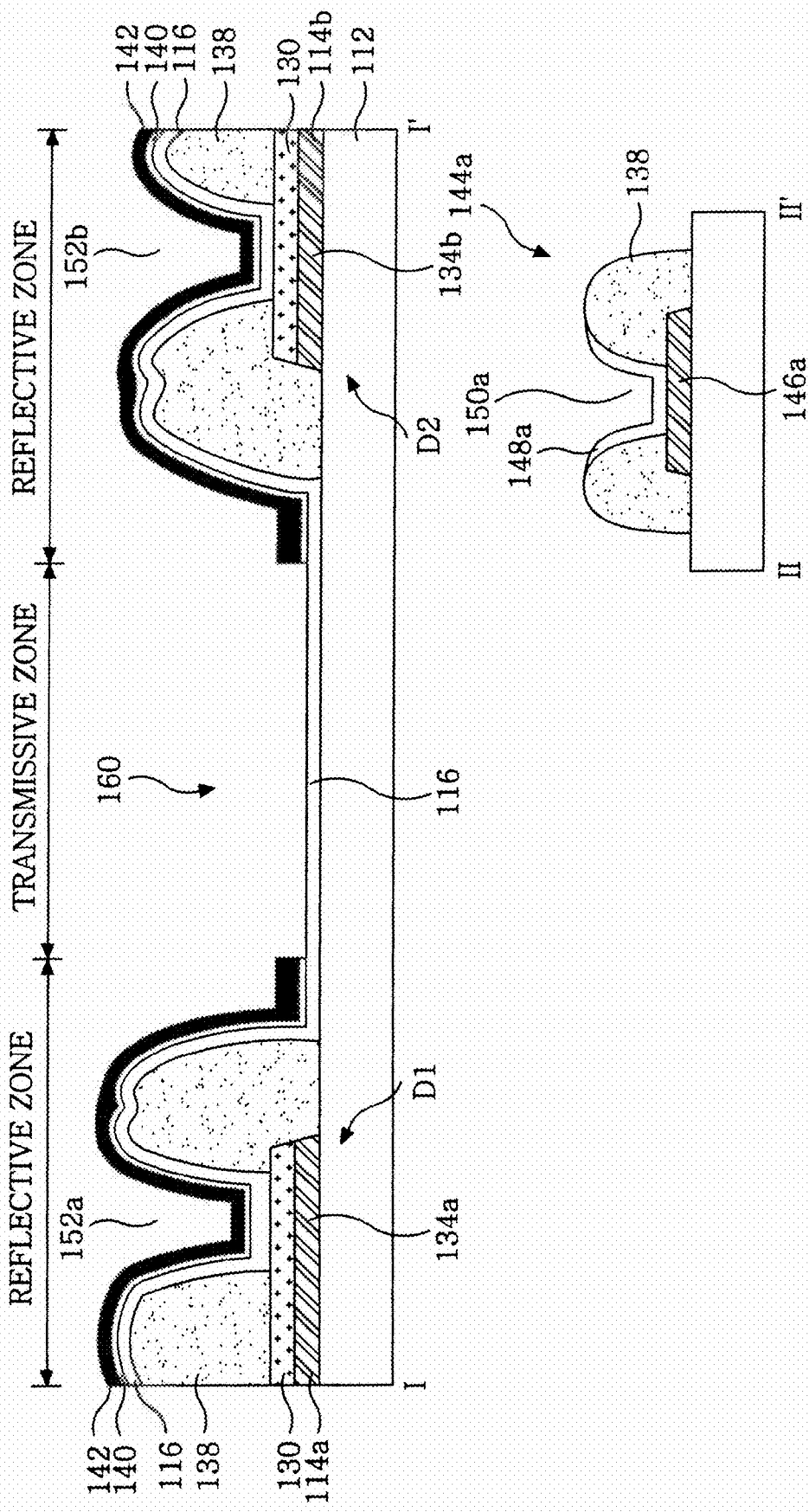

TRANSFLECTIVE TYPE DIODE SUBSTRATE AND METHOD HAVING RESPECTIVE MASKS FORMING SCAN LINE AND INSULATING PATTERN, ORGANIC PATTERN WITH HOLE EXPOSING INSULATING PATTERN, AND PIXEL ELECTRODE COVERING HOLE AND REFLECTION ELECTRODE OVERLAPPING ORGANIC PATTERN

This application is Divisional Application of U.S. patent application Ser. No. 11/798,771, filed on May 16, 2007, now U.S. Pat. No. 7,777,843 which claims the benefit of Korean Patent Application No. 10-2006-044285 filed on May 17, 2006, all of which are hereby incorporated by reference for all purposes as if fully set forth herein.

BACKGROUND OF THE INVENTION

1. Field of the Invention

The present invention relates to a liquid crystal display ("LCD") device and a method for fabricating the same. More particularly, the present invention relates to a transflective type diode substrate of an LCD device having a diode array for the switching element of the LCD device, and a method for fabricating the same.

2. Discussion of the Related Art

In general, a liquid crystal display device displays an image by controlling the optical transmittance of liquid crystal materials. Depending upon the light source for producing an image, LCDs may be classified into two types: a transmissive type in which the image is produced by using light from a back light unit disposed behind the LCD panel; and a reflective type in which the image is produced by reflecting ambient light. The transmissive type uses more energy than the reflective type. Because the reflective type depends on ambient light, it can not produce a viewable image in a dark environment.

In order to solve these problems a hybrid type of display, the transflective (transmissive+reflective) type, has been developed in which a transmissive mode using a back light unit and a reflective mode using ambient light are provided and may be selected by user. Because the transflective type LCDs may operate in reflective mode when the ambient light is sufficiently bright or in transmissive mode when the ambient light is insufficient, it consumes less energy, and it is not restricted by the brightness of the ambient light.

Generally, the transflective LC panel comprises a color filter substrate and a thin film transistor ("TFT") substrate that are joined to each other with a liquid crystal layer therebetween, and a back light unit disposed behind the TFT substrate. Each pixel of the transflective type LCD panel includes a reflective zone having a reflection electrode and a pixel electrode and a transmissive zone having a pixel electrode only.

As the TFT substrate of the transflective type LCD panel is manufactured using a semiconductor manufacturing process including many mask processing steps, the fabricating process is very complicated thus increasing the manufacturing cost.

SUMMARY OF THE INVENTION

Accordingly, the present invention is directed to a transflective type diode substrate and a method for fabricating the same that substantially obviates one or more of the problems due to limitations and disadvantages of the related art. An advantage of the present invention is to provide a simplified structure of the transflective type Diode LCD device having a diode for the switching element. Further, an advantage of the present invention is a fabricating method of the transflective type Diode LCD device having a diode for the switching element in which the manufacturing process for the LCD is simplified.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a transflective diode substrate for a liquid crystal display device, includes: a reflective zone including a diode having a scan electrode, an insulating pattern on the scan electrode and a pixel electrode over the scan electrode, organic patterns around the diode, and a reflection electrode over the organic patterns; and a transmissive zone adjacent to the reflective zone; wherein the pixel electrode is formed in the reflective zone and the transmissive zone.

In another aspect of the present invention, a method of manufacturing a transflective diode substrate of liquid crystal display device includes: forming a scan line on a substrate, a scan electrode connected to the scan line, and an insulating pattern on the scan line and the scan electrode using a first mask; forming an organic pattern and an organic hole exposing the insulating pattern using a second mask; and forming a pixel electrode covering the organic hole, forming a diode including the scan electrode, the insulating pattern and the pixel electrode, and forming a reflection electrode overlapping with the organic pattern with the pixel electrode therebetween using a third mask.

In another aspect of the present invention, a transflective diode substrate for a liquid crystal display device, includes: a reflective zone including first and second diodes having a scan electrode, an insulating pattern on the scan electrode and a pixel electrode over the scan electrode, organic patterns around the diode, and a reflection electrode over the organic patterns; a first scan line connected to the first scan electrode; a second scan line connected to the second scan electrode; and a transmissive zone adjacent to the reflective zone; wherein the pixel electrode is formed in the reflective zone and the transmissive zone; wherein the first diode is between a first scan electrode and the pixel electrode including; and wherein the second diode is between a second scan electrode and the pixel electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 5A to 5D illustrate cross sectional views describing the first mask process according to the present invention in detail;

FIGS. 7A and 7B illustrate the cross sectional views describing the second mask process according to the present invention in detail;

FIGS. 8A and 8B illustrate a plan view and a cross sectional view describing the third mask process of the manufacturing process for the transflective diode substrate according to the present invention; and FIGS. 9A to 9D illustrate the cross sectional views describing the third mask process according to the present invention in detail.

DETAILED DESCRIPTION OF THE ILLUSTRATED EMBODIMENTS

Reference will now be made in detail to an embodiment of the present invention, example of which is illustrated in the accompanying drawings.

Figure 1:
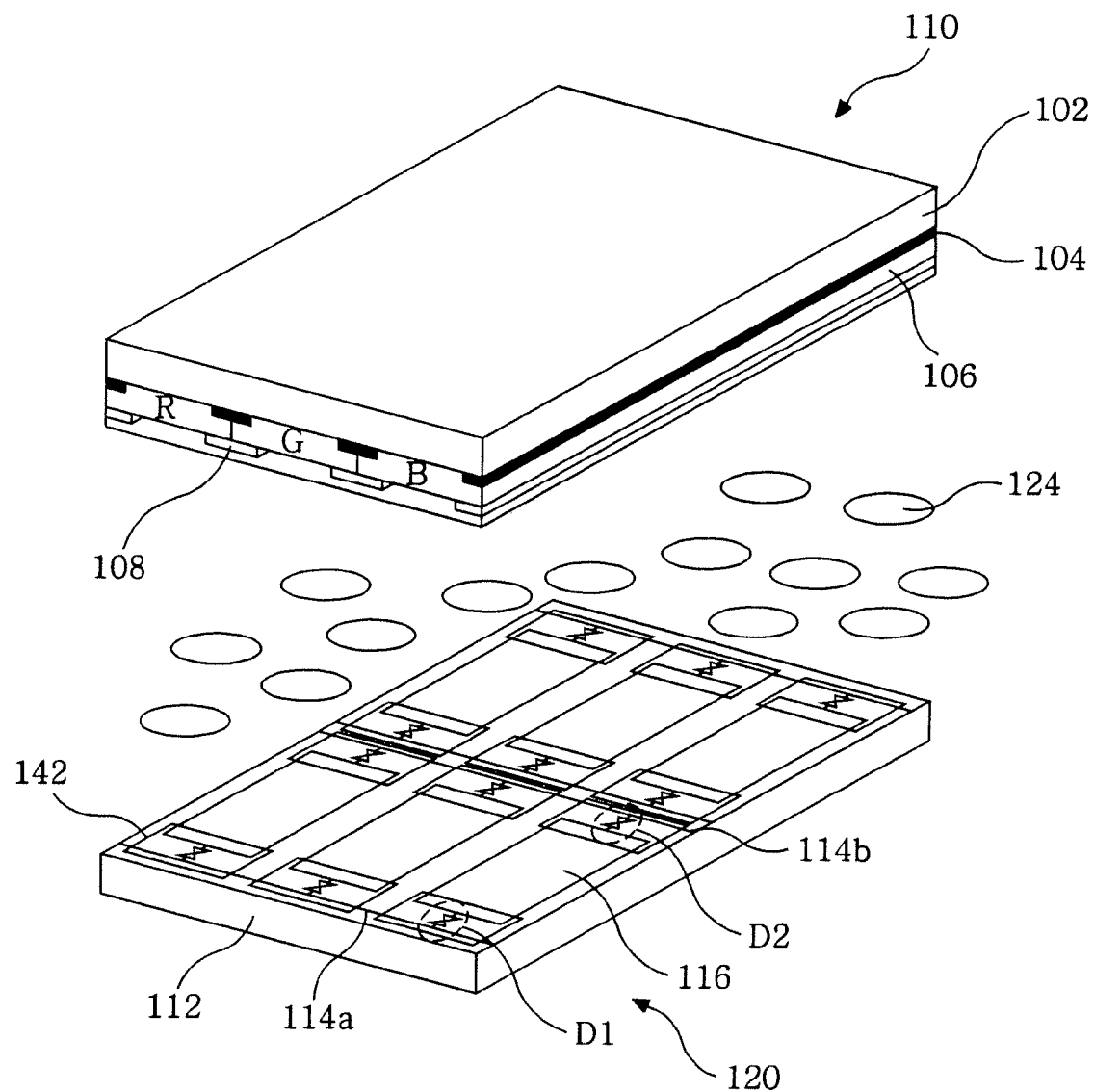
FIG. 1 illustrates the structure of a transflective liquid crystal display panel according to the present invention.

Referring to the FIG. 1, the transflective LCD panel according to the present invention includes a color filter substrate 110 and a diode substrate 120 that are joined to each other with a liquid crystal material 124 there between. The pixel of the transflective LCD panel is divided into a reflective zone having a reflective electrode 142 and a transmissive zone having a transparent pixel electrode 116.

The color filter substrate 110 includes a black matrix 104, a color filter 106 and a data line 108 formed on a upper substrate 102. The black matrix 104, a black colored material disposed on a upper substrate 102 with a mesh shape, partitions off the visible area of the upper substrate 102 into multiple cell areas in which the color filter 106 is formed, and the black matrix 104 prevents the light interference between neighboring cells and the reflection of ambient light. The color filter 106 is formed in the cell areas by spatially periodically repeating the R (red), G (green) and B (blue) color materials, and the color filters 106 transmit light to represent a color image. The data line 108 facing the pixel electrode 116 produces an electric field to drive the liquid crystal material 124.

The diode substrate 120 includes scan lines 114a and 114b, diodes D1 and D2 and a pixel electrode 116 formed in the cell area and a reflective electrode 142 formed in the reflective zone of the cell area overlapping with the pixel electrode 116.

Figure 2:
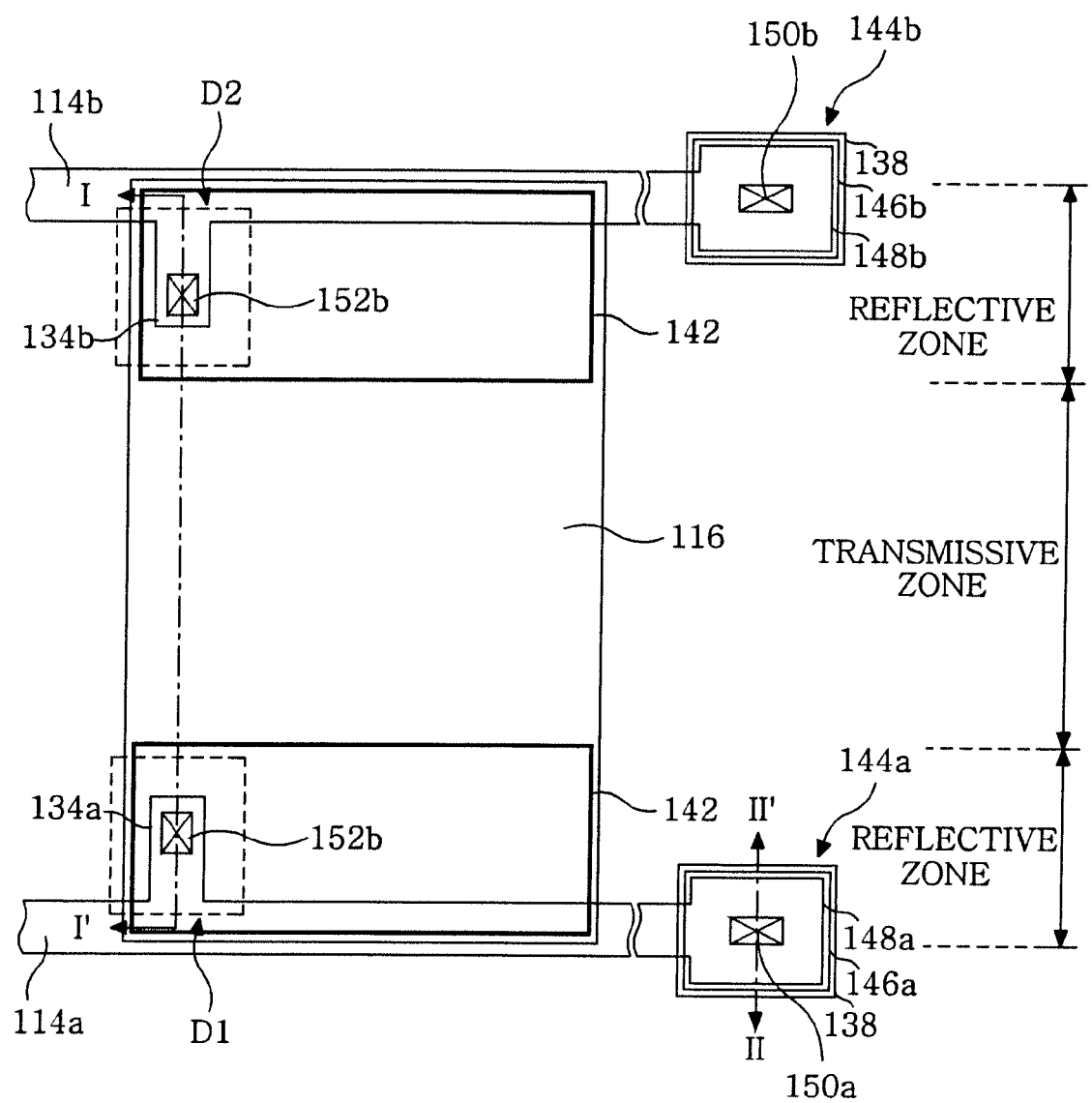
FIG. 2 illustrates a plan view of a diode substrate of the transflective LCD panel shown in the FIG. 1.
Figure 3:
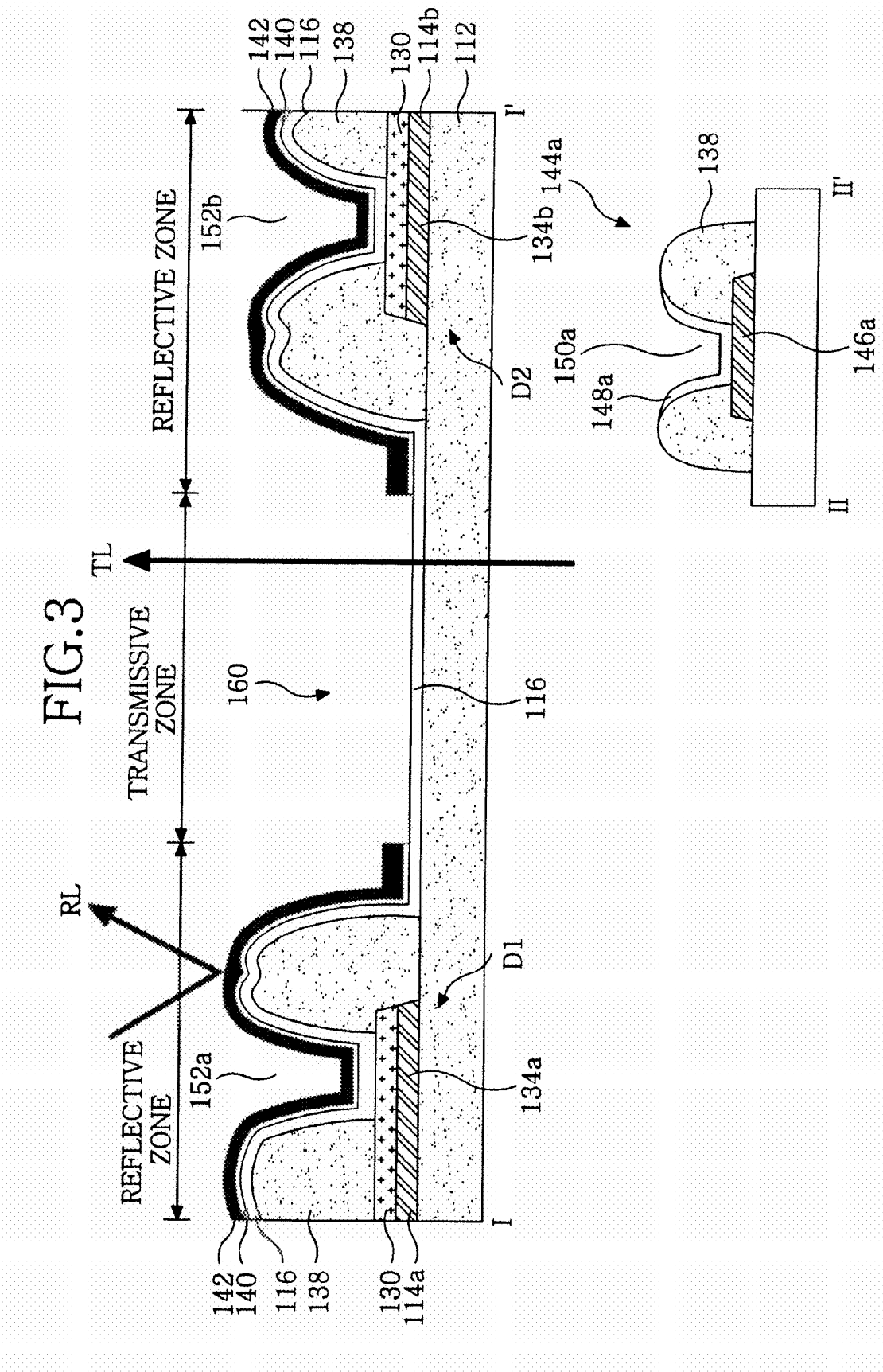
FIG. 3 illustrates cross sectional views cutting along the lines of I-I' and II-II' of the transflective diode substrate according to the present invention shown in the FIG. 2.

FIG. 2 is a plan view describing a transflective diode substrate according to an embodiment of this invention. FIG. 3 shows cross sectional views cutting the transflective diode substrate in the FIG. 2 along the cutting lines of I-I' and II-II'.

Referring to the FIGS. 2 and 3, the transflective diode substrate of this invention includes a pixel electrode 116, scan lines 114a and 114b, a reflection electrode 142, diodes D1 and D2 and scan pads 144a and 144b connecting to the scan lines 114a and 114b, respectively. Each pixel cell area of this transreflective diode substrate is partitioned into a reflective zone having a reflection electrode 142 and a transmissive zone having no reflection electrode 142.

The scan lines 114a and 114b connect with a driver IC (not shown in the figure) through the scan pads 144a and 144b The scan pads 144a and 144b include scan pad lower electrodes 146a and 146b. formed extending from the scan lines 114a and 114b, and scan pad upper electrodes 148a and 148b contacting the lower electrodes 146a and 146b. Between the scan pad lower electrodes 146a and 146b and the scan pad upper electrodes 148a and 148b, an organic pattern 138 may be inserted. In that case, the scan pad upper electrodes 148a and 148b contacting the driver IC contacts the scan pad lower electrodes 146a and 146b exposed through the contact holes 150a and 150b.

An insulating pattern 130 directly covers the upper portion of the scan lines 114a and 114b. In FIGS. 2 and 3, each one pixel cell has two diodes D1 and D2. Therefore, there are two scan lines. The first scan line 114a is close to the first side of the pixel electrode 116, and the second scan line 114b is close to the second side of the pixel electrode 116. However, if there is only one diode for one pixel cell, then there would only be one scan line.

The reflection electrode 142 is formed in the reflective zone of each pixel cell area to reflect the ambient light. This reflective electrode 142 may have an embossed pattern according to the pattern of the organic material 138. The embossed pattern is designed to enhance the reflection effectiveness.

In a transflective display, it is important to make the length of light paths of the light passing the liquid crystal material in the reflective zone and in the transmissive zone the same. To do so, in the transmissive zone, a transmissive hole 160 may be formed by patterning the reflection electrode 142 and the organic material to expose the pixel electrode 116. That is, the path length of the transmissive light (TL) passing through the transmissive zone and the liquid crystal layer is the same as the path length of the reflective light (RL) passing through the reflective zone and the liquid crystal layer. As a result, the effects of the reflective mode and the transmissive mode on the light are the same.

The pixel electrode 116 produces an electric voltage difference with the data line formed on the color filter substrate. This electric voltage difference produces an electric field that twists the liquid crystal material having an anisotropic dielectric property. Therefore, the light transmission rate is controlled to vary the light brightness according to the video signal generating the voltage difference.

Between the pixel electrode 116 and the reflection electrode 142, a protective pattern 140 may be additionally formed.

The diodes D1 and D2 include a pixel electrode 116 and the scan electrodes 134a and 134b overlapping the insulating pattern 130 there-between. The scan electrodes 134a and 134b extend into the pixel cell area from the scan lines 114a and 114b, respectively. The pixel electrode 116 contacts the insulating pattern 130 through the holes 152a and 152b penetrating the organic pattern 138 overlapping with the scan electrodes 134a and 134b. Therefore, the diodes D1 and D2 have diode switching characteristics due to the sandwiched structure of conductor/insulator/conductor. When a voltage over a threshold voltage is applied to the diodes D1 and D2 via the scan lines 114a and 114b, respectively, the diodes turns ON so that the video signal may be applied to the pixel electrode. After applying the turn-on voltage, if the diodes D1 and D2 are then turned off turn-off, the video signal voltage applied to the pixel electrode is maintained in charged condition until the next driving voltage is applied to the diodes. Therefore, the liquid crystal cell (Clc) including the pixel electrode 116 and data line facing with the liquid crystal layer there-between may continue to be driven by the charged voltage.

The diodes D1 and D2 used for switching elements are formed such that the first diode D1 connecting to the first scan electrode 134a is symmetrically disposed with the second diode D2 connecting to the second scan electrode 134b. The first scan electrode 134a is linked to the first scan line 114a, and the second scan electrode 134b is linked to the second scan line 114b. Electric signals having opposite polarity to each other through the first and second scan lines 114a and 114b are applied to the first and second diodes D1 and D2, respectively to drive the pixel. These diodes have an antisymmetric property in which the voltage varies according to the polarity. However, as the two diodes D1 and D2 having opposite polarity voltages applied are connected to one pixel electrode, the pixel electrode 116 may stably be supplied a voltage. As a result, a video quality problem due to the antisymmetric property of a single diode can be prevented.

The transflective diode substrate having the above mentioned structure according to the present invention is formed by a 3-mask process as follows.

Figure 4A:
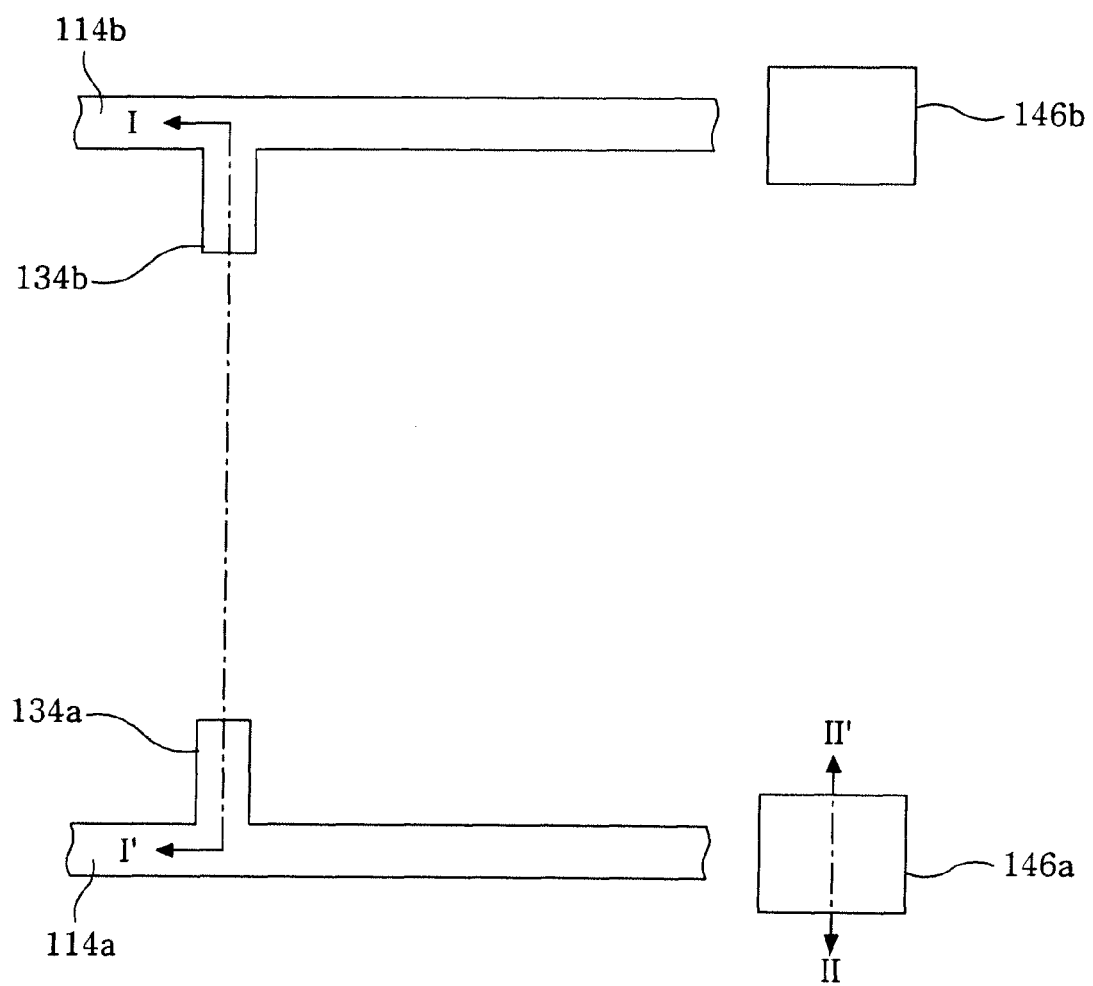
FIGS. 4A and 4B illustrate a plan view and a cross sectional view describing the first mask process of the manufacturing process for the transflective diode substrate according to the present invention.
Figure 4B:
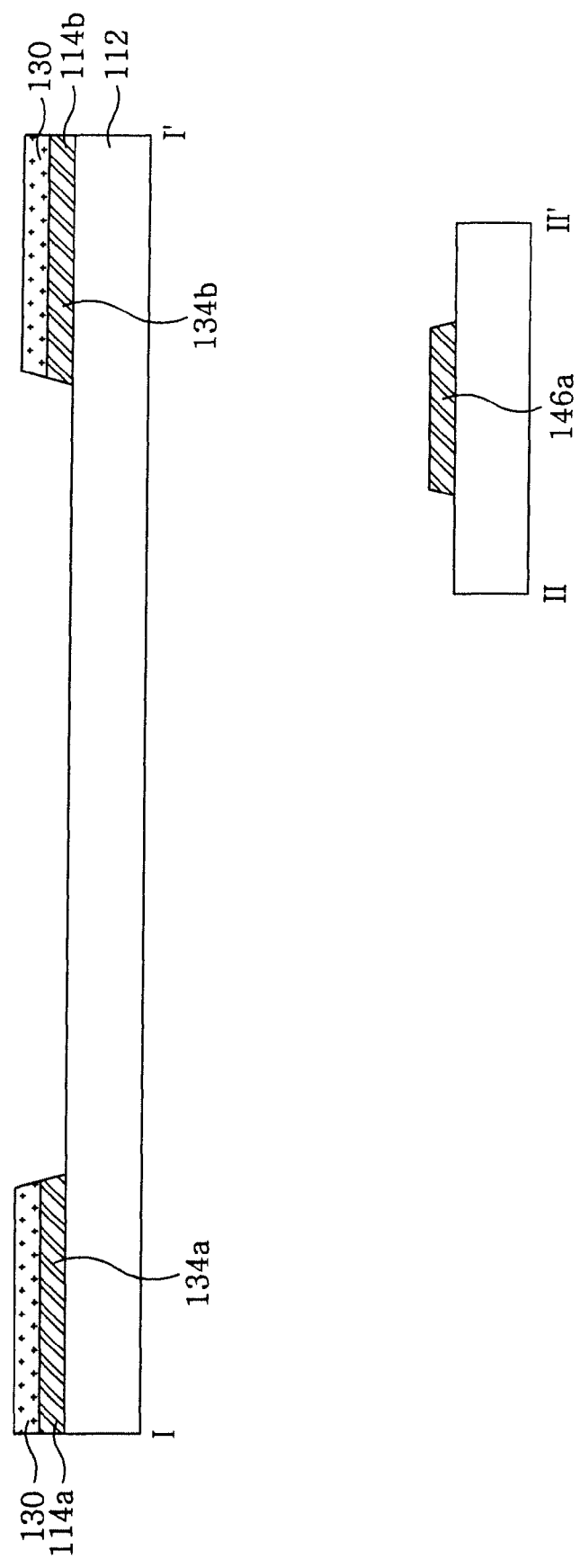

FIGS. 4A and 4B are the plan view and the cross sectional view, respectively for describing the first mask process of a method for manufacturing the transflective diode substrate according to the present invention. The FIGS. 5A to 5D are the cross sectional views for describing the first mask process in detail.

Referring to the FIGS. 4A and 4B, in the first mask process, scan lines 114a and 114b and scan pad lower electrodes 134a and 134b connected to the scan lines 114a and 114b, respectively are formed, on a lower substrate 112. Further, an insulation pattern 130 is formed on the scan lines 114a and 114b.

Referring to FIGS. 5A to 5D, the detailed process of the first mask process will be explained. On the lower substrate 112, using a deposit method such as a sputtering method, a metal material 170 such as Mo, Ti, Cu or Al(Nd) is deposited. On the metal material 170, an inorganic insulating material 172 such as the silicon nitride (SiNx:H) is deposited.

On the inorganic insulating material 172, photoresist is deposited. Then, the photoresist is exposed with the first mask 251 and developed. As a result, the first and second photoresist pattern 202a and 202b are formed as shown in FIG. 5A.

Here, the first mask 251 is a half-tone mask having a blocking zone (P1), a half-transmissive zone (P2) and a transmissive zone (P3). Exposing and developing the photo-resist using the first mask 251, the first photo-resist pattern 202a having a first height is formed at an area corresponding to the blocking zone (P1) and the second photo-resist pattern 202b having a second height lower than the first height is formed at an area corresponding to the half-transmissive zone (P2). Finally, the photo-resist located at the portion corresponding to the transmissive zone (P3) are removed to expose the inorganic insulating material 172.

Using the first and second photo-resist patterns 202a and 202b, the inorganic insulating material 172 and the scan metal material 170 are patterned by an etching process. Then, as shown in the FIG. 5B, scan lines 114a and 114b, scan electrode 134a and 134b and scan pad lower electrodes 146a and 146b (shown in FIG. 4A) are formed on the lower substrate 112. The insulating pattern 13 is formed on the scan lines and scan pad lower electrodes.

Figure 5B:
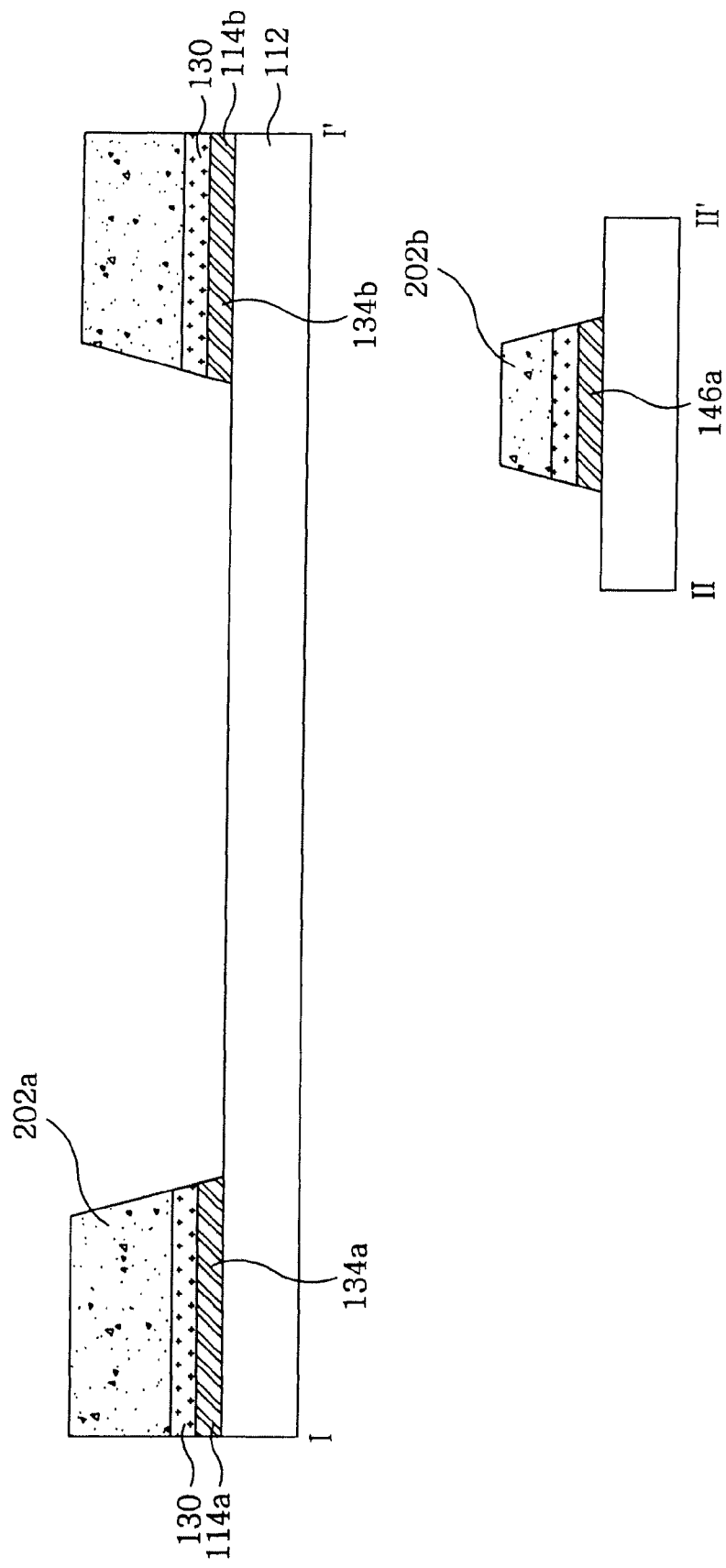
Figure 5C:
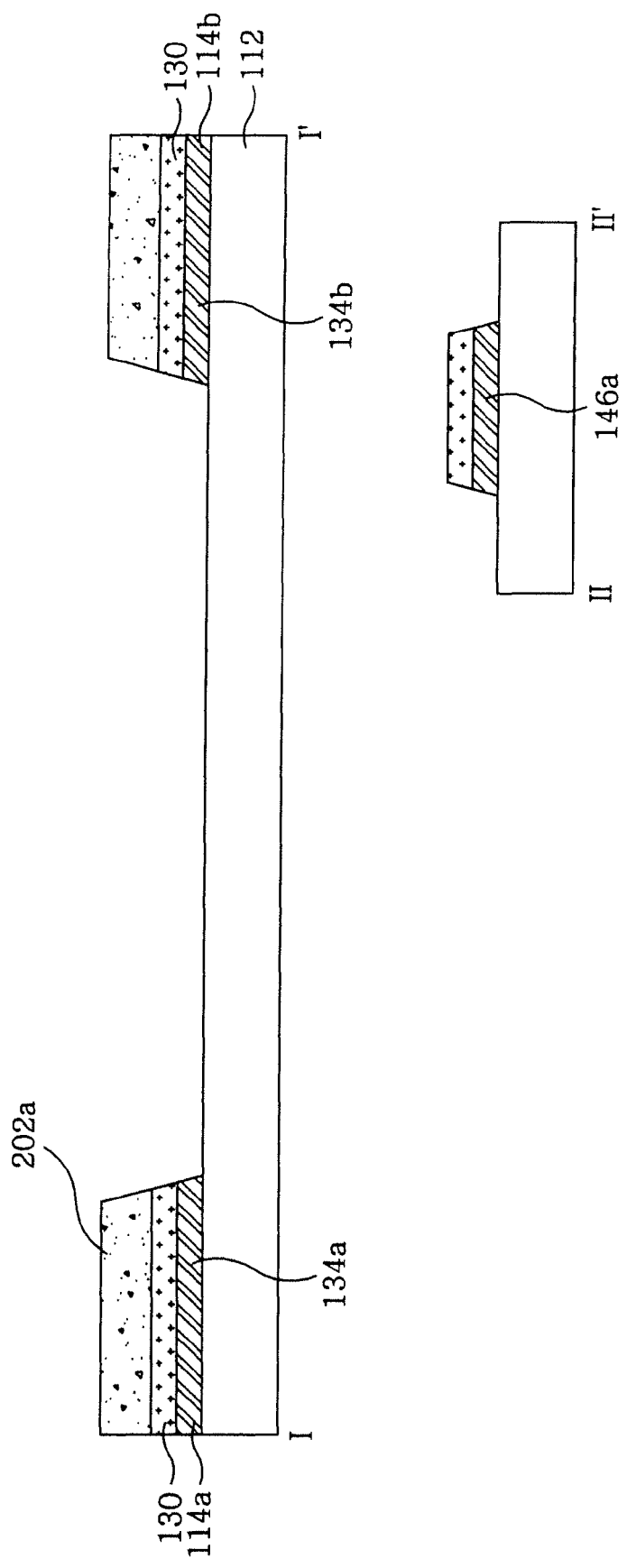

Next, the first and second photo-resist patterns 202a and 202b are ashed. As a result, the height of the first photo-resist pattern 202a is lowered and the second photo-resist pattern 202b is removed, as shown in FIG. 5C. Therefore, the insulating pattern 130 under the second photo-resist pattern 202b is exposed.

Figure 5D:
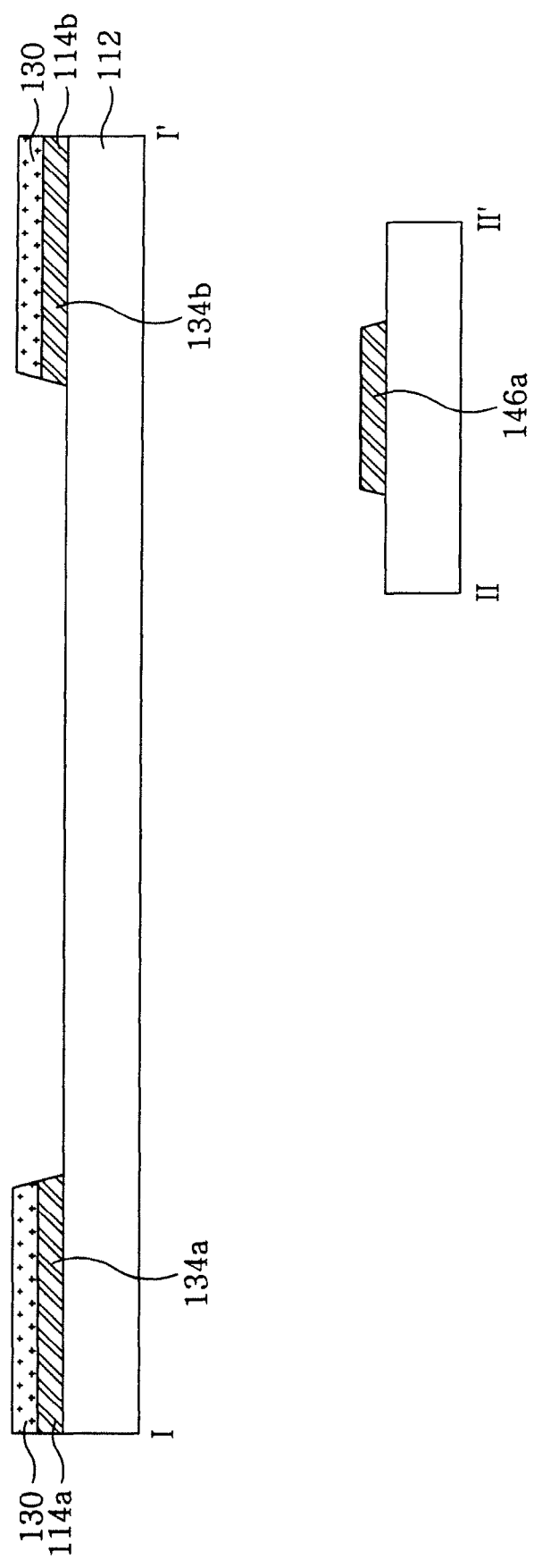

Using the first photo-resist pattern 202a having a height lowered by ashing process, the exposed insulating pattern 130 is patterned again. As shown in the FIG. 5D, the scan pad lower electrode 146a is exposed. After that, the remaining photo-resist pattern 202a is removed by a stripping process as shown in FIG. 5D.

Here, the first mask 251 may also be a refractive mask having a blocking zone, a refractive zone and a transmissive zone, instead of being a half-tone mask.

Figure 6A:
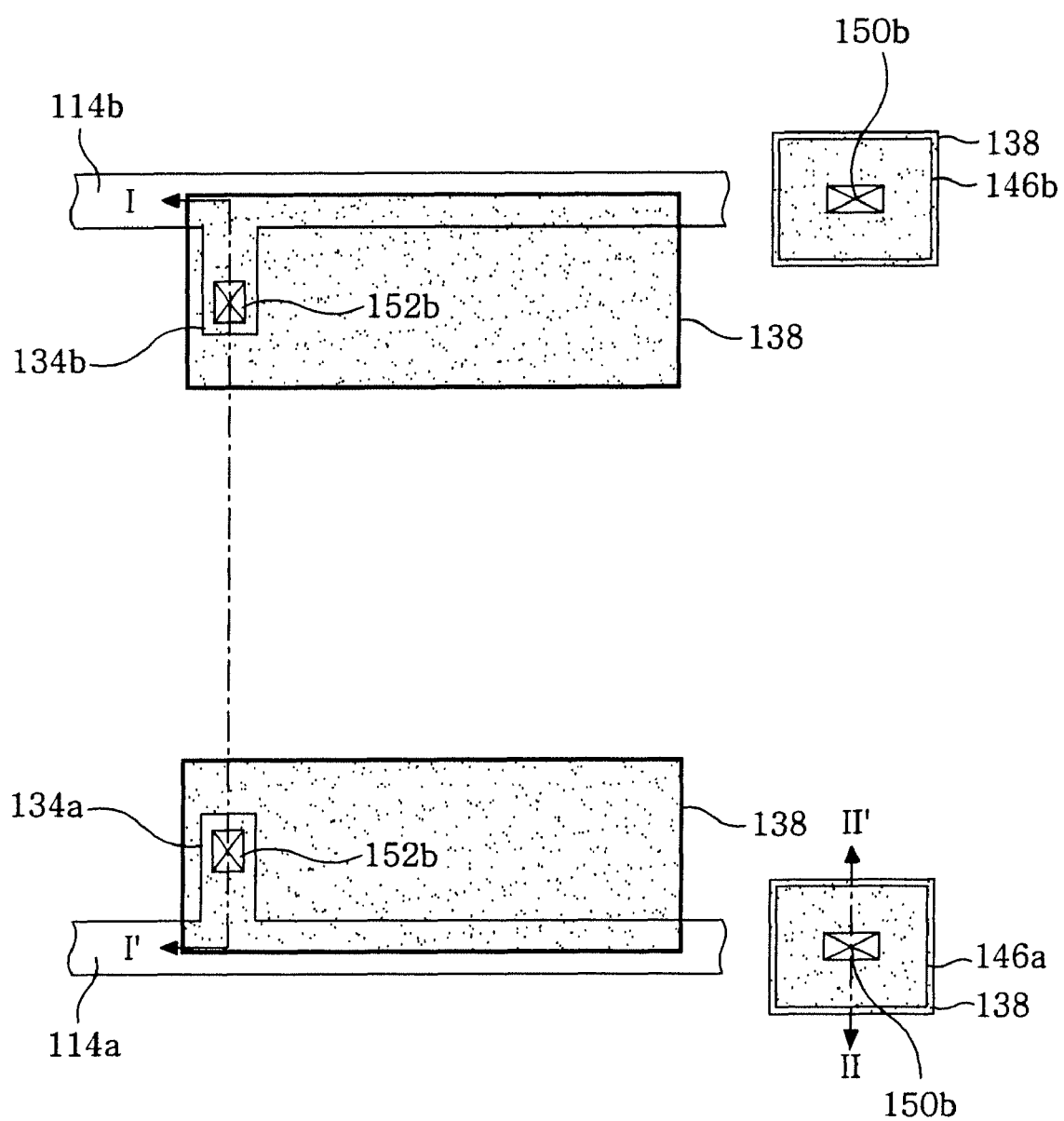
FIGS. 6A and 6B illustrate a plan view and a cross sectional view describing the second mask process of the manufacturing process for the transflective diode substrate according to the present invention.
Figure 6B:
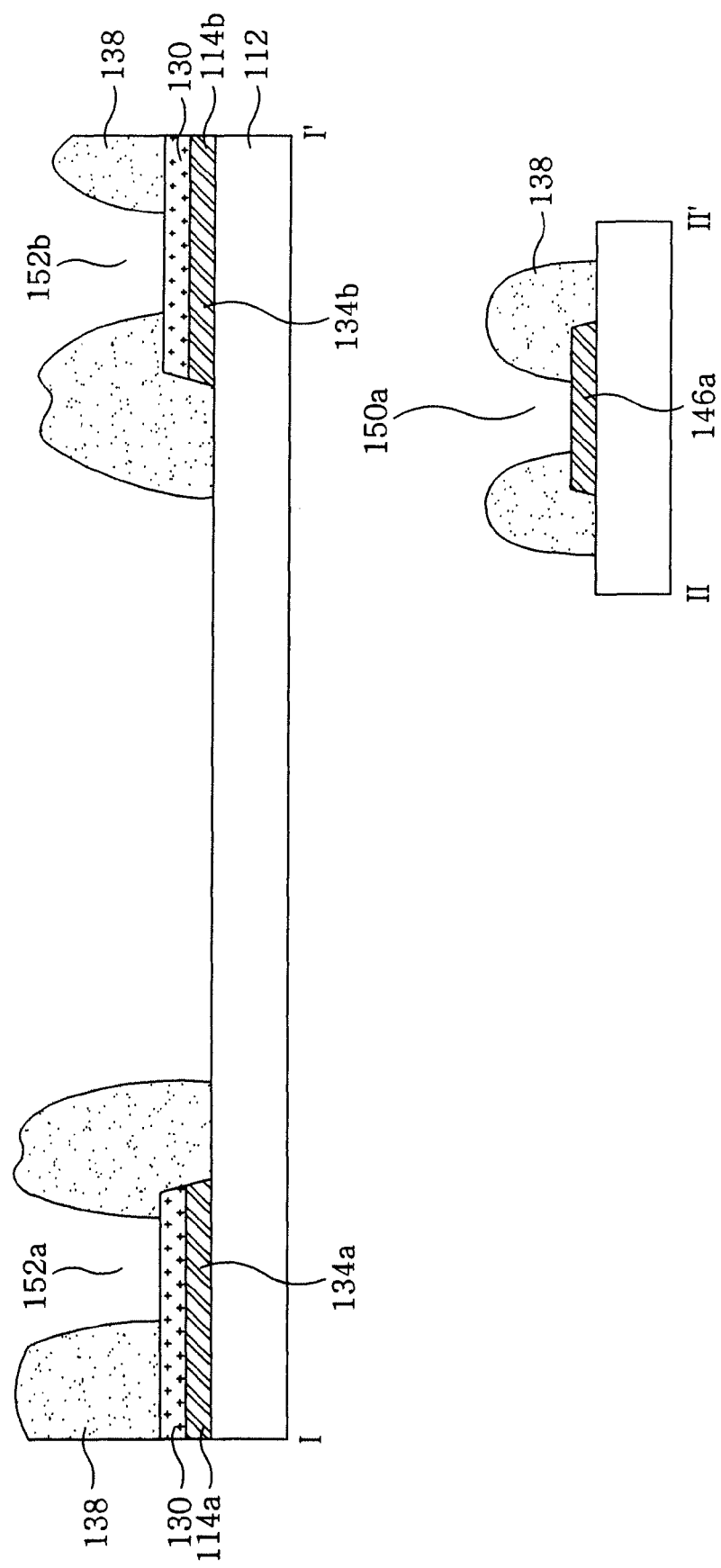
Figure 7B:
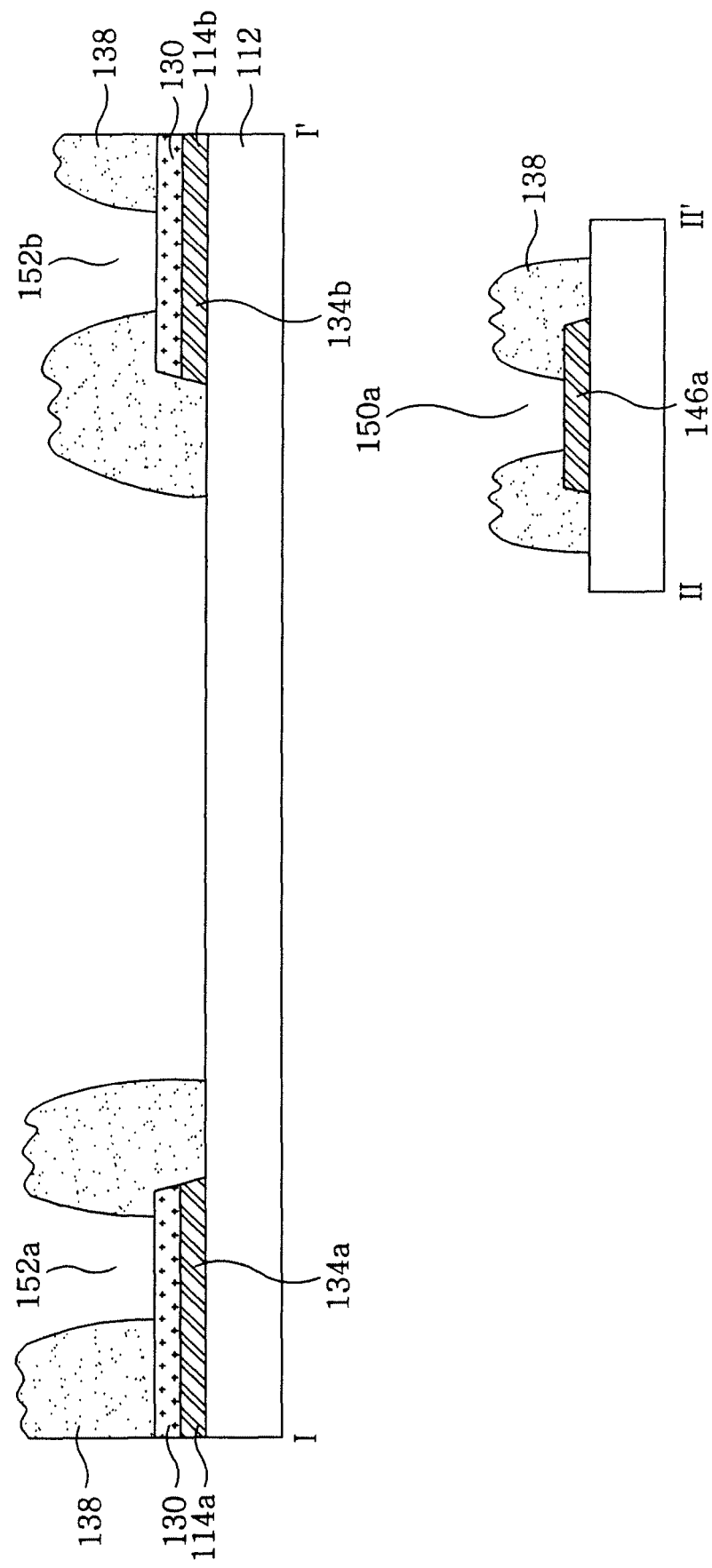

FIGS. 6A and 6B are a plan view and a cross sectional view for explaining the second mask process of a method for manufacturing the transflective diode substrate according to the present invention. FIGS. 7A and 7B are the cross sectional views for describing the second mask process in detail.

Referring to FIGS. 6A and 6B, an organic material pattern 138 having an embossed surface is formed in the reflective zone of the pixel cell area.

Referring to FIGS. 7A and 7B, the detailed process of the first mask process will be explained. A photo sensitive organic material 176 such as acryl is deposited on the lower substrate 112 having the scan lines 114a and 114b, scan pad lower electrode 146a and the insulating pattern 130 using a spin coating method.

Using a photo-lithography process with a second mask 252, the photo sensitive organic material 176 is patterned to form an organic pattern 138. The photo sensitive organic material 176 corresponding to the transmissive zone (P3) of the second mask 252 is completely removed. Further, the photo sensitive organic material 176 is completely removed in the pad area corresponding to the transmissive zone (P3) to form a contact hole 150a exposing the scan pad lower electrode 146a. The photo sensitive organic material 176 overlapped with the scan electrodes 134a and 134b is completely removed in the reflective zone corresponding to the transmissive zone (P3) of the second mask 252. As a result, organic holes 152a and 152b exposing the insulating pattern 130 on the scan electrodes 134a and 134b are formed. The other areas (P4) excepting the transmissive area (P3) in the second mask 252 have a structure in which the blocking area and refraction area (or half-tone portion) are alternatively disposed. As a result, the photo sensitive organic material 176 is patterned such that protrusions are formed in an area corresponding to the blocking area and grooves are formed in an area corresponding to the refraction area. Next, the photo sensitive organic material 176 is hardened so that the organic pattern 138 having an embossed surface in the reflective zone is formed.

Figure 8A:
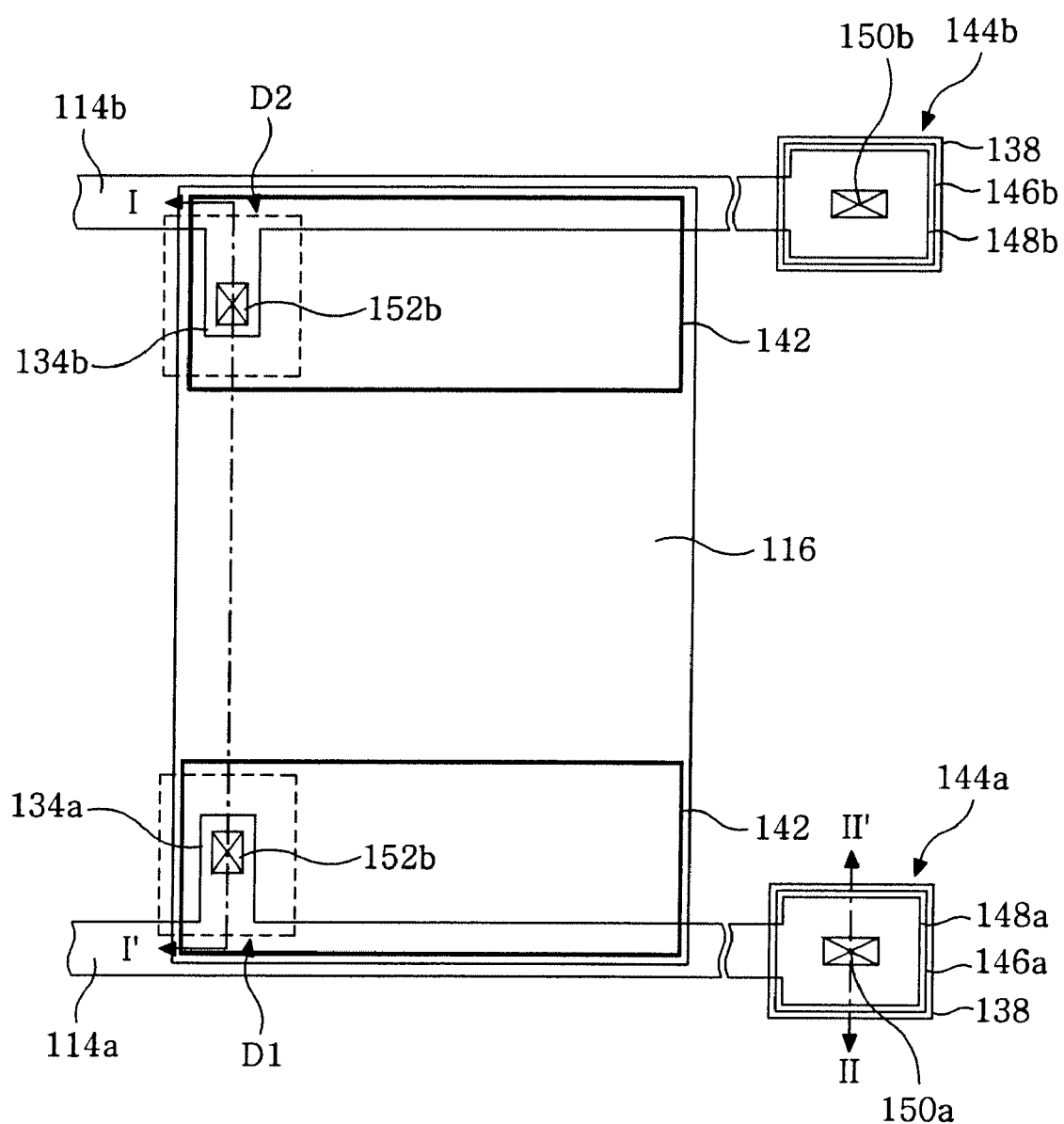

FIGS. 8A and 8B are a plan view and a cross sectional view for explaining the third mask process of method for manufacturing the transflective diode substrate according to the present invention. FIGS. 9A to 9D are cross section views for describing the third mask process in detail.

Referring to FIGS. 8A and 8B, the pixel electrode 116 covering the holes 152a and 152b is formed and a reflection electrode 142 is formed in the reflective zone with the third mask process. In addition, between the pixel electrode 116 and the reflection electrode 142, a protective pattern 140 may be formed.

Referring to FIGS. 9A to 9D, the detailed description of the third mask process will be explained. A transparent conductive material 180 such as ITO, TO or IZO and a reflective metal 184 such as AlNd are formed on the organic pattern 138 and the lower substrate 112, using a sputtering method. Before depositing the reflective metal 184, an inorganic insulating material 182 such as silicon oxide (SiOx) and silicon nitride (SiNx) may be deposited.

On the reflection metal 184, photo-resist is deposited. Using a photo-lithography process with a third mask 253, the photo-resist is exposed and developed. As a result, a third and a fourth photo-resist patterns 204a and 204b are formed as shown in FIG. 9A.

Here, the third mask 253 is a half-tone mask having a blocking portion (P1), a half-transmissive portion (P2) and a transmissive portion (P3) as found in the first mask 251 in FIG. 5A. Exposing and developing the photo-resist using the third mask 253, the third and fourth photo-resist patterns 204a and 204b having different heights are formed as shown in FIG. 9A. The photo-resist deposited at an area corresponding to the transmissive portion (P3) are removed to expose the reflection metal 184. Here, the third photo-resist pattern 204a is higher than the fourth photo-resist pattern 204b.

Using the third and fourth photo-resist patterns 204a and 204b, the inorganic insulating material 182 and the transparent conductive material 180 are patterned using an etching process. A pixel electrode 116 and a scan pad upper electrode 148a are formed as shown in FIG. 9B.

Figure 9C:
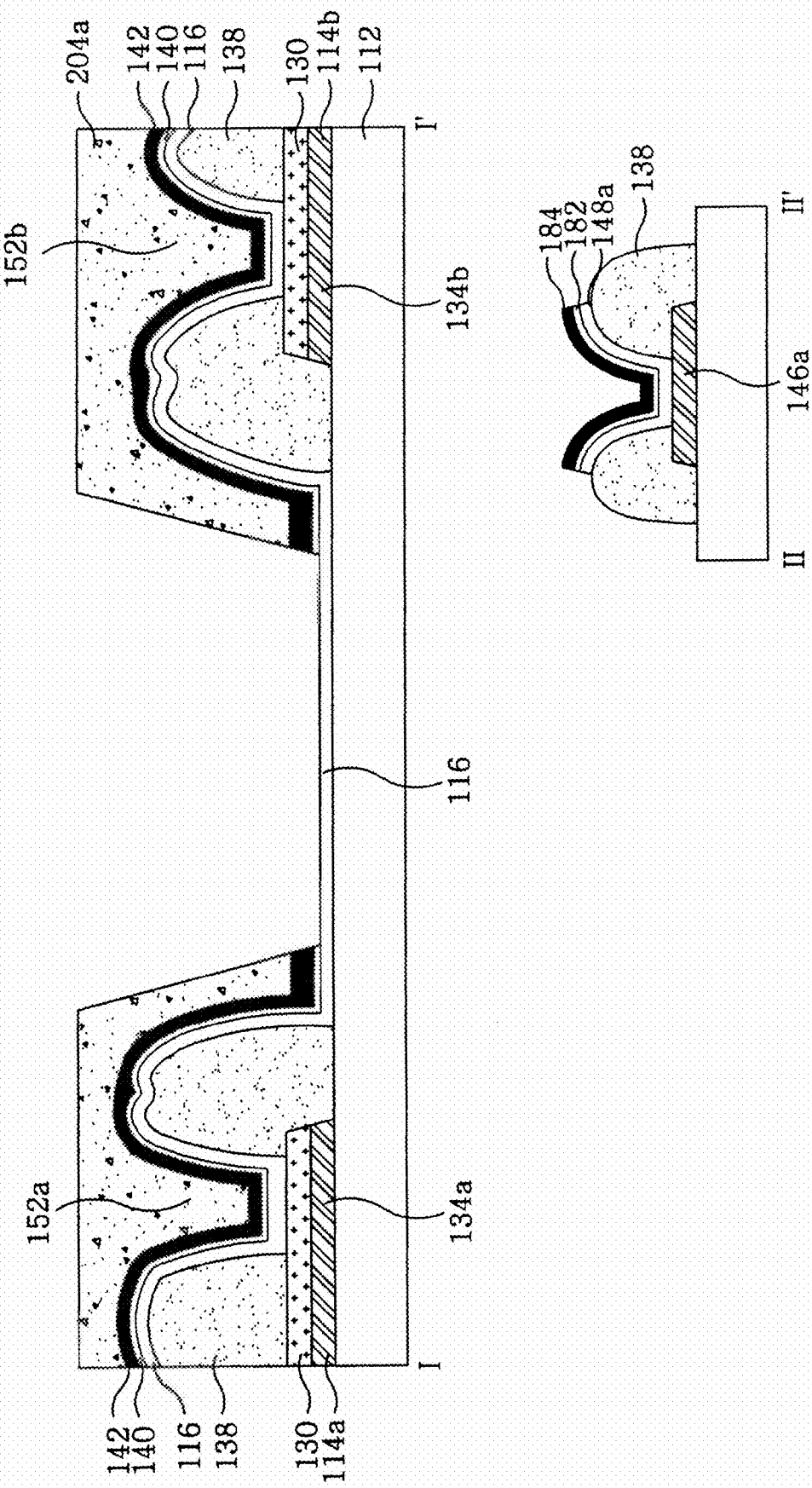

After that, the fourth photo-resist pattern 204b is removed in ashing process so that the third photo-resist pattern 204a remains with a lowered height as shown in FIG. 9C. The reflection metal 184 under the fourth photo-resist pattern 204b is exposed.

Using the remaining third photo-resist pattern 204a, the exposed reflection metal 184 and the inorganic insulating material 182 are etched to form a reflection electrode 142 and a protective film pattern 140. Further, in the transmissive zone, a transmissive hole 160 exposing the pixel electrode 116 by removing the reflection electrode 142 and the protective film pattern 140 and the scan pad upper electrode 148a are exposed. After that, the remaining third photo-resist pattern 204a is removed by a stripping process as shown in FIG. 9D.

The above third mask 253 may also be a refractive mask having a blocking portion, a refractive portion and a transmissive portion, instead of a half-tone mask.

Compared with a thin film transistor substrate, the present invention using the diode and the two-electrode element, as the switching element may simplify the substrate structure and method for manufacturing the switching substrate. The present invention suggests the manufacturing method for transflective diode substrate including a three mask process. Therefore, the productivity for manufacturing the transflective LCD panel may be improved.

In addition, the diode substrate and the method for manufacturing the diode substrate according to the present invention does not have a structure in which the data line and the scan line cross on the same substrate, but a structure in which they are formed on different substrates and then they are faced by joining the substrates. Therefore, the problem of shorts between the overlapped data line and scan line is prevented.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of manufacturing a transflective diode substrate of liquid crystal display device comprising:
   forming a scan line on a substrate, a scan electrode connected to the scan line, and an insulating pattern on the scan line and the scan electrode using a first mask;
   forming an organic pattern and an organic hole exposing the insulating pattern using a second mask; and
   forming a pixel electrode covering the organic hole, forming a diode including the scan electrode, the insulating pattern and the pixel electrode, and forming a reflection electrode overlapping with the organic pattern with the pixel electrode therebetween using a third mask.

2. The method for manufacturing a transflective diode substrate according to claim 1, wherein the scan line includes:
   a first scan line close to a first side of the pixel electrode and a second scan line close to a second side of the pixel electrode;
   wherein the diode includes a first diode connected to the first scan line and a second diode connected to the second scan line.

3. The method for manufacturing a transflective diode substrate according to claim 1, wherein the forming step using the first mask further forming a scan pad lower electrode connected to the scan line.

4. The method for manufacturing a transflective diode substrate according to claim 1, wherein the forming step using the first mask includes:
   depositing a scan metal, an inorganic material and photo-resist on the substrate sequentially;
   forming a first photo-resist pattern having a first height and a second photo-resist pattern having a second height lower than the first height, using a photo-lithography process using the first mask;
   patterning the inorganic insulating material and the scan metal to form the scan line, the scan electrode and the insulating pattern at an area corresponding to the first photo-resist pattern, and the scan pad lower electrode and the insulating pattern at an area corresponding to the second photo-resist pattern;
   ashing the first and second photo-resists to expose the insulating pattern on the scan pad lower electrode;
   etching the exposed insulating pattern to expose the scan pad lower electrode; and
   removing the remaining photo-resist pattern using a stripping process.

5. The method for manufacturing a transflective diode substrate according to claim 3, wherein the forming step using the third mask further forming a scan pad upper electrode connecting to the scan pad lower electrode.

6. The method for manufacturing a transflective diode substrate according to claim 5, wherein the forming step using the second mask further forming an organic pattern, between the scan pad lower electrode and the scan pad upper electrode, having a contact hole exposing the scan pad lower electrode.

7. The method for manufacturing a transflective diode substrate according to the claim 1, wherein the forming step using the third mask further forming a protective pattern between the pixel electrode and the reflection electrode.

* * * * *